United States Patent [19]

Ampferer et al.

[11] Patent Number: 4,693,216
[45] Date of Patent: Sep. 15, 1987

[54] CRANKSHAFT BEARINGS FOR INTERNAL-COMBUSTION ENGINES

[75] Inventors: Herbert Ampferer, Bietigheim-Bissingen; Klaus Gröger, Hemmingen, both of Fed. Rep. of Germany

[73] Assignee: Dr. Ing. h.c.F. Porsche Aktiengesellschaft, Fed. Rep. of Germany

[21] Appl. No.: 755,795

[22] Filed: Jul. 17, 1985

[30] Foreign Application Priority Data

Jul. 17, 1984 [DE] Fed. Rep. of Germany ....... 3426208

[51] Int. Cl.⁴ ............................................. F02F 7/00
[52] U.S. Cl. ................................ 123/195 R; 384/433; 384/912; 123/195 C
[58] Field of Search ........... 123/195 R, 195 H, 195 C; 384/433, 912

[56] References Cited

U.S. PATENT DOCUMENTS

| 2,334,916 | 11/1943 | Ford et al. | 123/195 H |
| 2,752,896 | 7/1956 | Emele | 123/195 R |
| 4,445,472 | 5/1984 | Ogawa et al. | 123/195 R |
| 4,453,509 | 6/1984 | Hayashi | 123/195 H |
| 4,465,041 | 8/1984 | Hayashi | 123/195 R |
| 4,467,754 | 8/1984 | Hayashi et al. | 123/195 C |
| 4,643,145 | 2/1987 | Bolton et al. | 123/195 R |

FOREIGN PATENT DOCUMENTS

| 653420 | 3/1929 | France | 123/195 H |
| 712307 | 7/1954 | United Kingdom | 384/433 |

Primary Examiner—Craig R. Feinberg

[57] ABSTRACT

These crankshaft bearings consist of a light-metal alloy and are formed by a bearing section of a crankcase and a bearing cap. In order to avoid a bearing clearance causing noise, a core made of iron metal is poured at least into the bearing cap, said core, by means of a bearing area, directly surrounding the crankshaft journal of a crankshaft, and having lugs for bores connected by a transverse part. The bores are penetrated by the screws in order to fasten the bearing.

15 Claims, 4 Drawing Figures

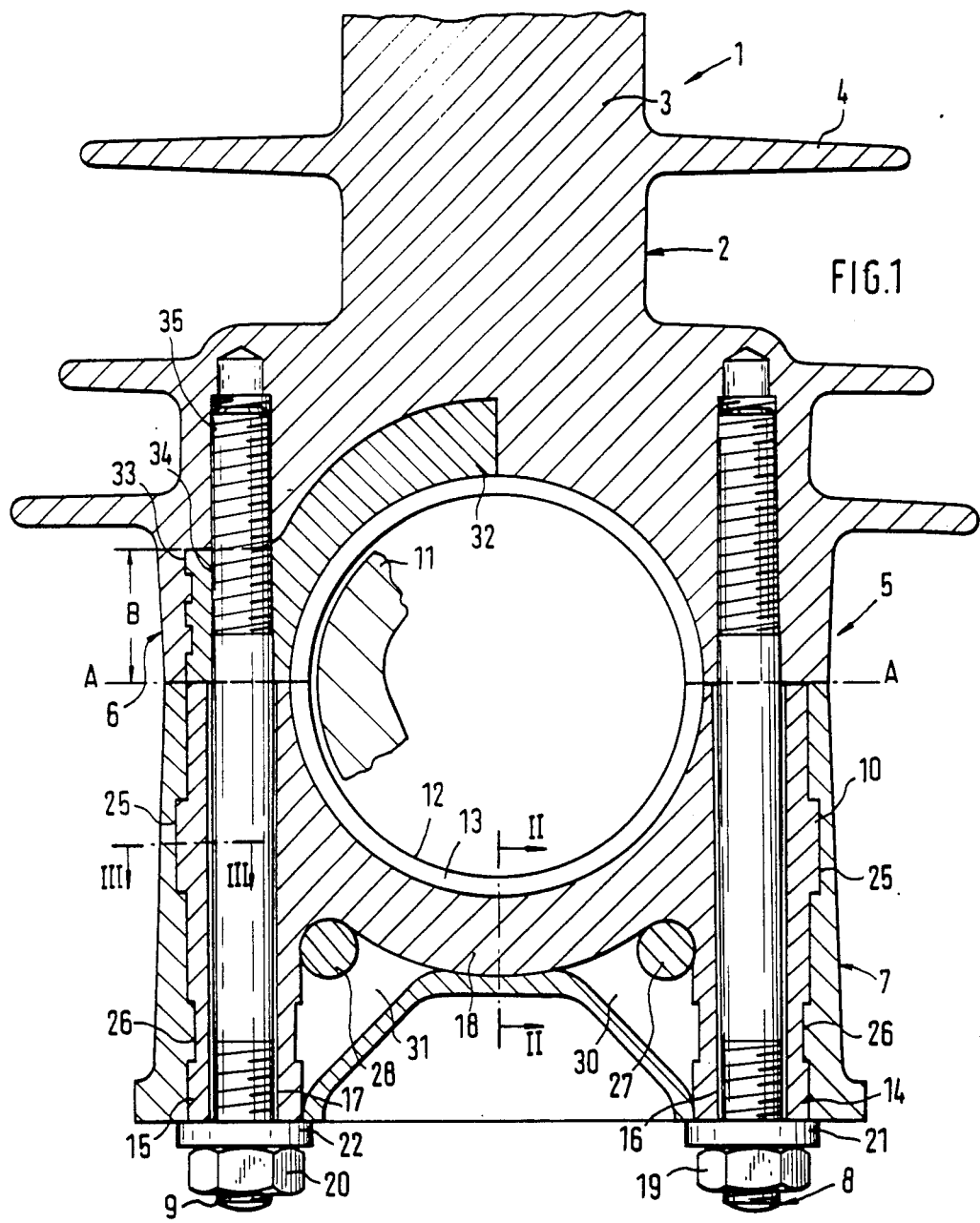

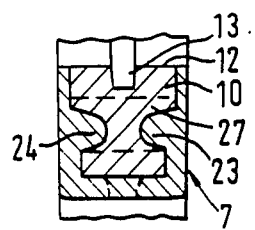
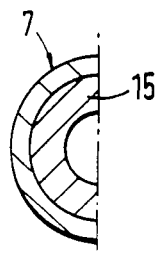
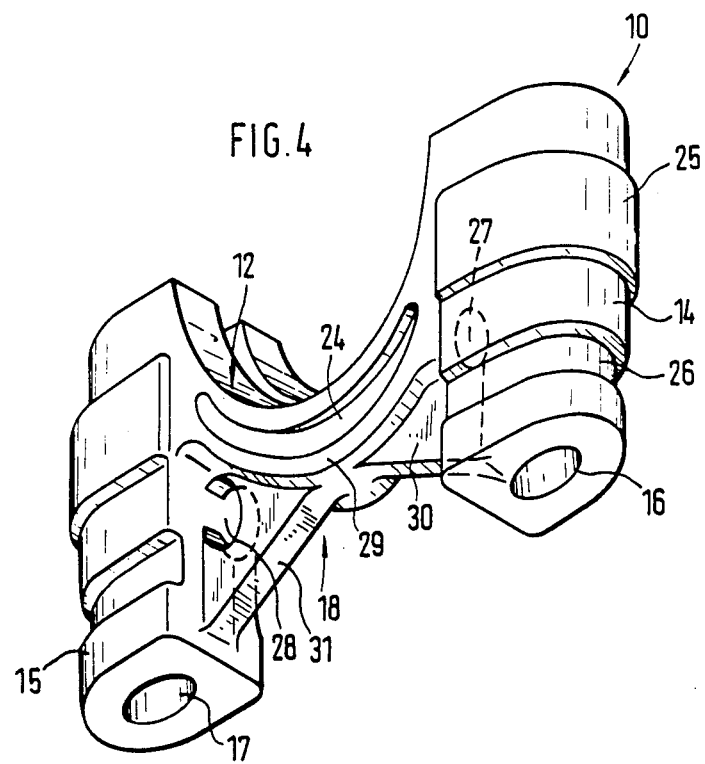

CRANKSHAFT BEARINGS FOR INTERNAL-COMBUSTION ENGINES

BACKGROUND AND SUMMARY OF THE INVENTION

This invention relates to crankshaft bearings for internal-combustion engines that are made of a light metal alloy. The crankshaft bearings are formed by the bearing sections of the crankcase and the bearing caps, the bearing caps being preferably mounted on a bridge. The bearing sections and the bearing caps are joined together by means of screws or bolts set apart from each other.

Known crankshaft bearings of the aforementioned type (EP-PS-European Pat. No. 003 865), because they are made of a light metal alloy, reduce the weight of an internal combustion engine. However, this weight reduction is achieved only at the cost of considerably increased mechanical noise. This noise is a result of the relatively extensive expansion of the light-metal crankshaft bearings at the operating temperatures of an internal combustion engine. The expansion causes the bearings to leave their originally intended tolerance zone which results in a bearing clearance occurring between the crankshaft journal and the bearings, thereby increasing mechanical noise.

In order to avoid this problem, it is known (DE-OS-German Published Unexamined Patent Application No. 31 35 863) to pour into the bearing cap of the crankshaft bearing a core of iron metal which is formed by a strip and extends transversely to the bearing cap at a distance from the crankshaft journal. This method of construction, however, does not achieve the desired reduction of noise, since the light-metal bearing surface of the bearing cap still expands and the strip, because of its low reinforcing and supporting function, does not prevent an effective enlargement of the bearing clearance.

Therefore, an objective of this invention is to provide crankshaft bearings for internal-combustion engines which, while maintaining their favorable weight, are constructed so as to avoid noise-increasing changes of the bearing clearance. This objective is achieved by providing a core of iron metal poured into at least the bearing caps, this core exhibiting lugs for bores penetrated by attaching screws and a transverse part extending between the lugs and forming a bearing area directly surrounding a crankshaft journal. In preferred embodiments the bearing caps are shaped so as to provide a toothed interlock of the core and bearing caps and the bridging transverse part includes openings for accomodating connectors extending between respective cores and bearings caps.

In certain preferred embodiments a further core of iron metal is provided in an opening of the crankcase, this further core being also penetrated by the bolts extending through the core sections in the bearing caps and held at the crankcase.

The advantages achieved by means of this invention are that considerable stiffness is supplied to the bearing caps by the cores of iron metal which reaches around the bearing surface and also by the lugs and the transverse part. The added stiffness to the bearing cap (which is a component of a light-metal bridge reinforcing the crankcase), permits an acceptable increase of the bearing play that will not cause any disturbing bearing noises. This stiffness is promoted even more by supporting the lugs at the bearing sections and by the tensioning means of the screws (screw nut, screw head) at the lugs. Through the selection of the cross-section, the core, having a relatively light weight, will have high stability. A good connection between the bearing cap and the core is achieved by means of the passage opening and the expansions and recesses forming the toothing along the lugs.

By means of a core provided only in the bearing caps, a considerable reduction of noise is attained in internal combustion engines which have a light-metal crankcase or light-metal bearings. This noise-reduction can be further optimized when a further core section is also provided in the bearing sections of the crankcase according to certain preferred embodiments of the invention. A good connection is assured in this case by screwing those screws holding the bearing cap in position into the thread of the bearing section and into its further core section.

Other objects and advantages of the present invention will be more apparent from the following detailed description of preferred embodiments, when taken in conjunction with the drawings.

BRIEF DESCRIPTION OF THE DRAWINGS

FIG. 1 is a partial cross-sectional view of an internal-combustion engine in the area of a crankshaft bearing arrangement constructed in accordance with a preferred embodiment of the invention;

FIG. 2 is a sectional view taken along Line II—II of FIG. 1;

FIG. 3 is a sectional view taken along Line III—III of FIG. 1; and

FIG. 4 is a perspective view of a core of a bearing cap of the crankshaft bearing constructed according to the invention.

DETAILED DESCRIPTION OF THE DRAWINGS

As part of a multi-cylinder internal-combustion engine 1 that is not shown in detail, a crankcase 2 is shown which is made of a light-metal alloy, one wall 3 of said crankcase 2 extending between cylinders that are also not shown. A crankshaft bearing 5 is mounted at the crankcase 2 equipped with reinforcing ribs 4, said crankshaft bearing 5 being formed by a bearing section 6 of the crankcase 2 and a bearing cap 7 (these parts being connected with one another in one piece as described below). both bearing parts are placed together in a horizontal plane A—A.

The bearing cap 7 may be a component of a bridge reinforcing the crankcase, said bridge carrying several bearing caps and consisting of a light-metal alloy. These types of bridges are described in the mentioned EP-PS No. 0038 560 and DE-PS No. 22 57 651.

The bearing cap 7 is held at the bearing section 6 by means of screws 8, 9 that act vertically to the plane A—A and are separated a distance from each other. In addition, the bearing cap 7 has a core 10 of iron metal-gray cast iron casting—which is poured into said bearing cap. A crankshaft journal 11 of a crankshaft that is only outlined is directly surrounded by the core 10; the latter having a running surface 12 and an oil groove 13 for the crankshaft journal 11. Lugs 14, 15 are also mounted at the core 10 which have bores 16, 17 for the screws 8, 9. The lugs 14, 15 that are connected with a transverse part 18 extend over the whole height of the bearing cap 7 and support themselves directly at the bearing section 6. Tensioning means 19, 20 support themselves at the opposite end of the lugs 14, 15, said tensioning means 19, 20, in the embodiment shown being represented by nuts, retaining rings 21, 22 being provided between said nuts and the lugs 14, 15. It is also contemplated for the tensioning means to be formed by screw heads.

The transverse part 18—as shown in FIG. 2—is developed to be double-T-shaped in its cross-section. This results not only in a sufficiently high stiffness but the material of the bearing cap 7 can penetrate into the recesses 23, 24 of the core 10, creating a good connection between both parts.

For the same purpose, expansions 25 and recesses 26 are provided at the lugs 14, 15 which have an angular shape for creating a toothing. These expansions 25 and recesses 26 are provided at the lugs 14, 15 in a ring-shaped manner (FIG. 3). In addition, passage openings 27, 28 are provided at the core 10 in the longitudinal direction of the crankshaft, through which openings an engaging connection between the bearing cap 7 and the core 10 is provided.

According to FIG. 4, the running surface 12 of the core 10 is assigned to a bearing area 29 of the transverse part 18, which surrounds the crankshaft journal 11 in a ring-shaped manner. Ribs 30, 31 are provided below the bearing area 29 which are narrower than the bearing area and taper off at it. Passage openings 27, 28 are provided at the ribs 30, 31.

When the bearing cap 7 is developed as described above, good results are achieved with respect to the decrease of noise of internal combustion engines. These results can be optimized further by also providing the bearing section 6 with a core 32 (FIG. 1, left half schematically showing this further embodiment, the core, although not shown in FIG. 1, actually extending the width of the bearing section 6 in the further embodiment). The lugs 33 of the core 32 extend only over a partial area B of the bearing section 6. However, the bores 16, 17 are continued in the core 32 and in bearing section 6 and in addition are provided with threads 34, 35, so that they cooperate with the core 32 and the bearing section 6.

Although the invention has been described and illustrated in detail, it is to be clearly understood that the same is by way of illustration and example only, and not to be taken by way of limitation. The spirit and scope of the invention are to be limited only by the terms of the appended claims.

What is claimed is:

1. Crankshaft bearings that consist of a light metal alloy formed by bearing sections and bearing caps, each of said bearing caps being held by screw means to a respective one of said bearing sections and each said bearing cap having a core means of ferrous metallic material, wherein:

said core means having at least two lugs extending between opposite faces of said bearing cap and being separated from one another with a transverse part means extending between and connected to said lugs forming a bearing support section of said crankshaft bearings, reinforcing means being connected between said lugs for reinforcing said core means, said lugs receiving said screw means, and wherein said screw means extend into a bottom of each of said bearing sections for holding each of said bearing caps against the bottom of the respective one of said bearing sections.

2. An arrangement according to claim 1, wherein each said bearing cap is made of a light metal alloy.

3. An arrangement according to claim 1, wherein said lugs support themselves directly at each said bearing section.

4. An arrangement according to claim 1, wherein said lugs have bore means which are penetrated by the screw means.

5. An arrangement according to claim 1, wherein said screw means are threaded bolt means.

6. An arrangement according to claim 1, wherein the screw means include tensioning means supported at said lugs.

7. An arrangement according to claim 1, wherein said core means consists of a gray cast-iron alloy.

8. An arrangement according to claim 1, wherein said transverse part means exhibits double-T-shape in cross-section.

9. An arrangement according to claim 1, wherein said core means along said lugs has at least one of expansion means and depression means for the toothed interconnection of said core means with each said bearing cap means.

10. An arrangement according to claim 1, wherein said expansion means and depression means are angular.

11. An arrangement according to claim 1, wherein at least aperture means are provided in said core means to achieve a good connection between each said core means and each said bearing cap.

12. An arrangement according to claim 1, wherein said bearing support section includes a bearing area means formed in part by the core means that surrounds a crankshaft journal means in a ring-shaped manner, and said reinforcing means is a rib means provided below the bearing area means on the core means, said rib means being narrower than the bearing area means.

13. An arrangement according to claim 1, further comprising further core means poured into said bearing section having bore means.

14. An arrangement according to claim 13, further comprising lugs for the bore means in said further core means extending only over a partial area of said bearing section, said bore means being continued in said bearing section beyond said further core means.

15. An arrangement according to claim 14, wherein said screw means interact with thread means provided in said further core means and in said bearing section.

* * * * *